United States Patent
Hawkins et al.

(10) Patent No.: US 9,236,962 B2
(45) Date of Patent: Jan. 12, 2016

(54) GENERATING REACH AND FREQUENCY DATA FOR TELEVISION ADVERTISEMENTS

(75) Inventors: John Alastair Hawkins, London (GB); Simon Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 1972 days.

(21) Appl. No.: 12/257,879

(22) Filed: Oct. 24, 2008

(65) Prior Publication Data

US 2010/0088714 A1 Apr. 8, 2010

Related U.S. Application Data

(63) Continuation of application No. 12/247,069, filed on Oct. 7, 2008.

(51) Int. Cl.
| | |
|---|---|
| *G06Q 30/00* | (2012.01) |
| *H04H 20/14* | (2008.01) |
| *G06Q 30/02* | (2012.01) |
| *H04H 60/66* | (2008.01) |
| *H04N 7/16* | (2011.01) |
| *H04N 21/24* | (2011.01) |
| *H04N 21/258* | (2011.01) |
| *H04N 21/266* | (2011.01) |
| *H04N 21/466* | (2011.01) |

(Continued)

(52) U.S. Cl.
CPC ............. *H04H 20/14* (2013.01); *G06Q 30/02* (2013.01); *H04H 60/66* (2013.01); *H04N 7/16* (2013.01); *H04N 21/2407* (2013.01); *H04N 21/25891* (2013.01); *H04N 21/26603* (2013.01); *H04N 21/4667* (2013.01); *H04N 21/6582* (2013.01); *H04N 21/812* (2013.01)

(58) Field of Classification Search
CPC ....................................................... G06Q 30/02
USPC ....................... 705/14.41, 14.45, 14.52, 14.68
See application file for complete search history.

(56) References Cited

U.S. PATENT DOCUMENTS 7,853,969 B2 * 12/2010 Smith et al. ...................... 725/22
7,895,076 B2 * 2/2011 Kutaragi et al. ............ 705/14.41

(Continued)

FOREIGN PATENT DOCUMENTS

| WO | WO2006026736 A2 | 3/2006 |
| WO | WO2006127470 A2 | 11/2006 |

OTHER PUBLICATIONS

U.S. Appl. No. 12/055,906, filed Mar. 26, 2008, Volovich et al.

(Continued)

*Primary Examiner* — Arthur Duran
(74) *Attorney, Agent, or Firm* — Fish & Richardson P.C.

(57) ABSTRACT

Television reporting records are accessed and processed to generate frequency specific reach values and device frequencies for creatives (e.g., television advertisements). The device frequencies indicating the number of times a creative was presented by use of a particular viewing device. The frequency specific reach values indicating the number of unique viewing devices that were used to present the creative a specified number of times. Estimating frequency specific reach values and device frequencies for a creative for a viewing population. The estimated frequency specific reach values and device frequencies for the viewing population are based on known viewing pattern data for multiple creative airings from a sample of the viewing population (e.g., a subset of the viewing population) and estimated viewing pattern data for the airings for the viewing population.

16 Claims, 7 Drawing Sheets

(51) Int. Cl.
*H04N 21/658* (2011.01)
*H04N 21/81* (2011.01)

(56) References Cited

U.S. PATENT DOCUMENTS

2004/0216157 A1 10/2004 Shain et al.
2007/0220545 A1 9/2007 Awano
2008/0263578 A1 10/2008 Bayer et al.

OTHER PUBLICATIONS

U.S. Appl. No. 12/247,069, filed Oct. 7, 2008, Hawkins et al.
PCT International Preliminary Report on Patentability and the Written Opinion, PCT/US2009/059708, Apr. 21, 2011, 8 pages.
Notification of Transmittal of the International Search Report and the Written Opinion of the International Searching Authority, or the Declaration, PCT/US2009/059708, Jan. 21, 2010, 18 pages.

* cited by examiner

GENERATING REACH AND FREQUENCY DATA FOR TELEVISION ADVERTISEMENTS

This application is a continuation application of U.S. application Ser. No. 12/247,069, filed Oct. 7, 2008. The contents of U.S. application Ser. No. 12/247,069 are incorporated by reference as part of this application.

BACKGROUND

This disclosure relates to television advertising.

Viewing information about creatives, e.g., television advertisements, presented by display devices, e.g., televisions, can be collected by viewing surveys in which members of a viewing population provide information about their viewing patterns; or by viewing devices, e.g., set top boxes, that automatically collect and transmit viewing pattern information to a collection entity. For example, for multiple airings of a particular creative, the number of times the creative was presented (impressions) can be determined based on anonymized viewing information collected through viewing surveys and/or viewing devices, and creative airing information (e.g., creative airing times and corresponding airing channels). To gauge the exposure of the creative or advertising campaign, e.g., a group of related creatives, to the viewing population advertisers look to viewership metrics such as impression figures, the number of times a particular device was used to present the creative ("device frequency"); and, for each unique device frequency (or group of unique device frequencies), the number of devices having that unique device frequency ("frequency specific reach value"); collectively referred to as "exposure data."

Typically, the viewing information collected from the viewer surveys and/or the viewing devices represents the viewing patterns of only a fraction of the viewing population. When viewing information is available only from a sample group of the viewing population, exposure data for the entire viewing population can be estimated based on the exposure data derived from the known viewing information of the sample group. Such estimation provides advertisers a more complete representation of the actual exposure of the creative. However, the accuracy of the estimated exposure data for the viewing population is dependent on both the accuracy of the exposure data for the sample group and the technique employed to estimate the data from the sample group to the viewing population.

SUMMARY

In general, the subject matter of this specification relates to systems and methods for determining frequency specific reach values and device frequencies for creatives.

One aspect of the subject matter described in this specification can be embodied in a system having a processing device and software stored on a computer readable medium which has instructions that can be executed by the processing device. Execution of the instructions cause the processing device to access television reporting data. The television reporting data includes viewing identifiers identifying viewing devices; creative identifiers identifying creatives that were presented by use of the viewing devices; and time data identifying times at which the creatives were presented by use of the viewing identifiers, creative identifiers and time data are associated to identify, for each viewing device, the creatives presented by use of the viewing device and the times at which the creatives were presented. Execution of the instructions also cause the processing device to define frequency bins, each frequency bin corresponding to a frequency at which a creative is presented by use of a unique viewing device; and cause the processing device to process the television reporting data to generate device frequency data and frequency specific reach data. The device frequency data include device frequencies that quantify, for each viewing device, a frequency that each creative was presented by use of that viewing device during a reporting period. The frequency specific reach data include frequency specific reach values that quantify, for each creative and each frequency bin, a number of viewing devices that were used to present the creative at a frequency corresponding to the frequency bin. Execution of the instructions also cause reach and frequency reporting data to be generated, the reach and frequency reporting data detail creative exposure and include the frequency specific reach data and the device frequency data. Access to the reach and frequency reporting data is provided to television advertisers.

Another aspect of the subject matter described in this specification can be embodied in a method that includes the actions of accessing television reporting records from a television reporting data store. Each television reporting record including a viewing identifier identifying a viewing device; a creative identifier identifying a creative that was presented by use of the viewing device; and time data identifying times at which the creative was presented by use of the viewing device. The viewing identifier, creative identifier and time data are associated to identify the creatives presented by use of the viewing device and the times at which the creative was presented. The method also includes defining frequency bins, each frequency bin corresponding to a frequency at which a creative is presented by use of a unique viewing device. The method further includes processing the television reporting records to generate device frequency data and frequency specific reach data. The device frequency data include device frequencies that quantify, for each viewing device, a frequency that each creative was presented by use of that viewing device during a reporting period. The frequency specific reach data include frequency specific reach values that quantify, for each creative and each frequency bin, a number of viewing devices that were used to present the creative at a frequency corresponding to the frequency bin. The method also includes generating reach and frequency reporting data that include the frequency specific reach data and the device frequency data detailing creative exposure. The method further includes providing access to the reach and frequency reporting data to television advertisers.

Still another aspect of the subject matter described in this specification can be embodied in a method that includes the actions of accessing device frequency data that include device frequencies and frequency specific reach data that include frequency specific reach values from a reach and frequency data store. The device frequencies and the frequency specific reach values are based on multiple airings of a creative, each airing defining a unique creative time slot in which the creative was aired. The method includes calculating the number of total reported impressions of the creative for all airings based on the device frequencies and the frequency specific reach values. The method further includes for each airing, calculating the number of estimated impressions of the creative and calculating a number of total estimated impressions for all airings based on the numbers of estimated impressions for each airing. The method also includes calculating a scale factor based on the number of total estimated impressions and the number of total reported impressions and adjusting the device frequency data and frequency specific reach data according to the scale factor. The method further includes generating adjusted reach and frequency reporting data including the adjusted frequency specific reach data and the adjusted device frequency, and providing access to the adjusted reach and frequency reporting data to television advertisers.

Yet another aspect of the subject matter described in this specification can be embodied in a system having a processing device and software stored on a computer readable medium having instructions executable by the processing device. Execution of the instructions cause the processing device to access device frequency data that include device frequencies and frequency specific reach data that include frequency specific reach values. The device frequencies and the frequency specific reach values are based on multiple airings of a creative, each airing defining a unique creative time slot in which the creative was aired. Execution of the instructions also cause the processing device to calculate a number of total reported impressions of the creative for all airings based on the device frequencies and the frequency specific reach values. For each airing, the number of estimated impressions of the creative are calculated. Execution of the instructions further cause the processing device to calculate the number of total estimated impressions for all airings based on the numbers of estimated impressions for each airing, to calculate a scale factor based on the number of total estimated impressions and the number of total reported impressions, and to adjust the device frequency data and frequency specific reach data according to the scale factor. Adjusted reach and frequency reporting data that include the adjusted frequency specific reach data and the adjusted device frequency data detailing creative exposure are generated. Execution of the instructions also cause access to the adjusted reach and frequency reporting data to be provided to television advertisers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Television Advertisement System Overview

Figure 1:
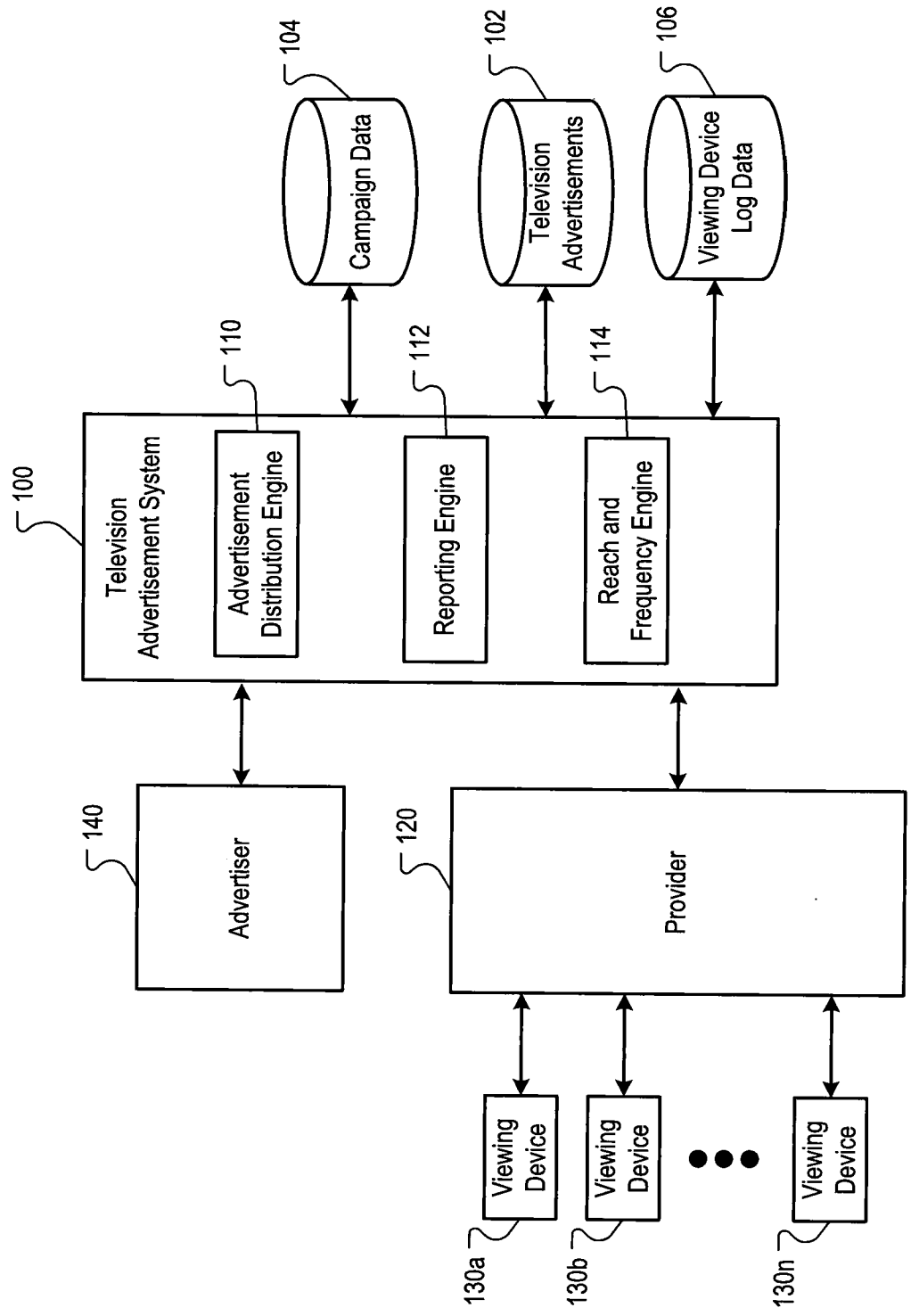
FIG. 1 is a block diagram of an example television advertisement system.

FIG. 1 is a block diagram of an example television advertisement system 100. The television advertisement system 100 can, for example, deliver relevant content items, e.g., television advertisements/creatives, to viewers to facilitate operator monetization of programming and quantification of advertisement delivery to target markets. A creative can be, for example, a video portion of a television advertisement. The video portion of the advertisement can include audio and text. The creative can be shown separately from a television program in the form of a television commercial, or can be shown concurrently with a television program in the form of an overlay or text stream on a portion of a television display. For convenience, advertisements and creatives are collectively referred to as "advertisements" herein.

The television advertisement system 100 can, for example, be implemented on one or computer servers, and can provide and receive data over a network. Example networks include local area networks (LANs), wide area networks (WANs), telephonic networks, and wireless networks (e.g., 802.11x compliant networks, satellite networks, cellular networks, etc.). Additionally, the television advertisement system 100 can, for example, communicate over several different types of networks, e.g., the Internet, a satellite network, and a telephonic network.

In general, the television advertisement system 100 can receive television advertisements and advertisement campaign data from an advertiser 140, e.g. an entity that provides television advertisements, such as a commercial entity that sells products or services, an advertising agency, or a person. The television advertisement system 100 can facilitate the provisioning of television advertisements to a television provider 120, e.g., an entity that facilitates the delivery of a television broadcast to viewers, such as cable provider, a digital satellite provider, a streaming media provider, or some other media provider.

The television advertisement system 100 can also, for example, obtain anonymized impression data related to viewing devices 130a-130n. Example viewing devices 130 include set top boxes, digital video recorders and tuners, and other television processing devices that facilitate the viewing of the television signal on a television device. For example, logs related to viewing device 130 activity, e.g., set top box logs, can be anonymized to remove personal information related to viewing activities and provided to the television advertisement system 100. In another implementation, such information can be provided by the provider 120, or by a third party.

Impressions can, for example, be measured statistically. An impression can be a household impression, e.g., the airing of an advertisement in household and independent of the number of televisions in a household. If the advertisement is presented by use of a viewing device in the household, one household impression can be recorded. Other impression types can also be used. For example, impressions can be generated by a program rating percentage, e.g., a percentage of viewership in measurable households; or by a program share percentage, e.g., a percentage of viewership in active measured homes; or by some other statistical measurement.

By way of another example, impressions can be measured by an analysis of activity logs of the viewing devices 130. For example, a household may have three viewing devices 130, and at a given time two of the devices 130 may be tuned to a first channel and the third device may be tuned to a second channel. If a first advertisement airs on the first channel and a second advertisement airs on the second channel, impressions can be generated for each viewing device 130.

An impression can be dependent on a television channel tune status when an advertisement airs on a channel. For example, an impression can occur when a viewing device 130 is tuned to a broadcast stream in which an advertisement is inserted, and the viewing device 130 remains tuned to the broadcast stream for N consecutive seconds during the actual display time of the insertion. For example, an impression can be defined as a viewing device 130 remaining tuned to a broadcast stream for five seconds after the advertisement begins to air. Alternatively, an impression can be defined as a viewing device 130 tuned to a broadcast stream when an advertisement is airing and remaining tuned to the broadcast stream for five seconds after tuning to the broadcast stream. Other tune times can also be used.

Likewise, other impression types can also be used. For example, an impression can be based on an advertisement exposure, e.g., a brief exposure of an advertisement, or a full viewing of the advertisement, of a threshold viewing in between, e.g., five seconds, or five seconds of the first fifteen seconds; or a percentage of the advertisement viewed, etc.

In an implementation, the television advertisement system 100 can also include one or more data stores to store television advertisements and associated data, e.g., performance data related to the television advertisements, log data from the viewing devices related to the viewing patterns of the audience, etc. In one implementation, the television advertisement system 100 includes a television advertisement data store 102, a campaign data store 104, and a viewing device log data store 106.

The television advertisement data store 102 can, for example, include advertisements that can be broadcast or aired during an advertisement spot. Example television advertisements include video advertisements, banner advertisements, overlay advertisements, such as logos, URLs, dynamic pricing information for an advertisement, etc., and other advertisements that can be used to convey information visually and/or aurally during a television broadcast.

The campaign data store 104 can include, for example, advertising campaign information for multiple advertisers. Each campaign may include, for example, a campaign identifier identifying an advertising campaign. Each campaign identifier can be associated with one or more advertisement identifiers (creative identifiers) to identify advertisements associated with the advertising campaign. For example, a game system manufacturer may have a holiday season game console advertising campaign with two advertisements, one advertisement for a handheld gaming console and one advertisement for a desktop gaming console.

The viewing device log data store 106 can include, for example, data logs from viewing devices 130, e.g., set top boxes, satellite receivers, etc. The log data store 106 can include reporting data that identifies channel tunes, e.g., a channel identifier to which the viewing device was tuned, such as may occur when the viewing device 130 is processing video data to record and/or display, and channel tune times, e.g., the times that the viewing device was tuned to a channel. Other data can also be included, e.g., key presses of remote devices associated with the viewing devices. 130, commands received by the viewing devices 130, etc. For example, if the viewing device 130 is a digital video recorder, the log data can include a list of recorded programs, and for each recorded program a record that indicates whether the recorded program has been played back, and the actions taken during playback, such as fast forwarding or skipping commercials can be included.

The television advertisement data store 102, campaign data store 104, and viewing device log data store 106 can be implemented separately or in combination. For example, in one implementation, the advertisement data store 102, campaign data store 104 and log data store 106 can be implemented in a single advertisement database. Other combinations and/or subcombinations can also be used.

The television advertisement system 100 can include an advertisement distribution engine 110, a reporting engine 112, and a reach and frequency engine 114. The advertisement distribution engine 110, reporting engine 112, and reach and frequency engine 114 can, for example, be distributed among a plurality of computer devices, e.g. server computers communicating over a network, or can be implemented on a single computer, e.g., as multiple threads on a server computer. Other implementation architectures can also be used. The advertisement distribution engine 110, reporting engine 112, and reach and frequency engine 114 can, for example, be implemented in software, such as executable object code, interpreted script instructions, or in combinations of executable and interpreted instructions. Other software and/or hardware implementations can also be used.

The advertisement distribution engine 110 can, for example, be configured to provide approved advertisements to the television provider 120. In one implementation, the advertisements are provided to the television provider 120 in advance of airing the advertisements. In some implementations, after receiving a request for any new advertisements to be downloaded for airing by the provider 120, the television advertisement system 100 can, for example, label the download with a particular ID that can be used later to identify the advertisement and the distribution engine 110 can deliver the advertisement to the appropriate provider 120.

The reporting engine 112 can, for example, receive advertisement report information from the provider 120 and determine whether the selected television advertisement aired based on the advertisement report information. For example, an advertisement may not air due to a programming irregularity, e.g., a sporting event going beyond a scheduled broadcast, an interruption to scheduled programming due to breaking news, etc. In an implementation, the reporting engine 112 can process reporting logs, e.g., set top box logs, from viewing devices 130 to determine advertisement impressions and/or false positive impressions.

The reach and frequency engine 114 can, for example, generate frequency specific reach values and device frequencies for advertisements and/or advertising campaigns, and generate reach and frequency reporting data (e.g., reports that graphically and/or textually represent the frequency specific reach data and device frequency data).

For example, the reach and frequency engine 114 can derive frequency specific reach values and device frequencies based, in part, on the anonymized viewing pattern information from the viewing devices 130 included in the log data 106 and/or from the processed reporting logs from the reporting engine 112. The reach and frequency engine 114 can also, for example, estimate frequency specific reach values and device frequencies for viewing populations with incomplete reporting records, e.g., a viewing population having a number of viewing devices that do not report viewing pattern information.

The derivation of device frequencies and frequency specific reach values from the log data 106 is explained with reference to Table 1, which is populated with data derived from the viewing pattern information reported by three viewing devices 1, 2, and 3:

TABLE 1

|  | Viewing Device 1 | Viewing Device 2 | Viewing Device 3 |
|---|---|---|---|
| Airing A | X | X |  |
| Airing B | X | X | X |
| Airing C | X | X |  |

An airing is a unique advertisement time slot for a particular channel in which an advertisement is aired. Table 1 includes data for one advertisement that was aired three times: airings A, B, and C and according to Table 1, viewing devices 1 and 2 were used to present the advertisement three times (each presented the advertisement for airings A, B, and C) and viewing device 3 was used to present the advertisement one time (airing B). The device frequency of a viewing device is the number of times that an advertisement was presented by use of that viewing device during a reporting period. Based on the information in Table 1 for the three-airing reporting period, the device frequency for viewing devices 1 and 2 is three and the device frequency for viewing device 3 is one, as shown on Table 2:

TABLE 2

|  | Viewing Device 1 | Viewing Device 2 | Viewing Device 3 |
|---|---|---|---|
| Device Frequency | 3 | 3 | 1 |

A frequency specific reach value is the number of viewing devices that were used to present an advertisement at frequency corresponding to a frequency bin. A frequency bin corresponds to a frequency, e.g. number of times, at which an advertisement is presented by use of a unique viewing device 130. For example, based on the information in Table 3, the frequency specific reach value associated with frequency bin 1, corresponding to a frequency of one, is one. Thus only one unique viewing device (viewing device 3) was used to present the advertisement only one time. The frequency specific reach value associated with frequency bin 2, corresponding to a frequency of two, is zero. Thus no viewing devices were used to present the advertisement only two times. The frequency specific reach value associated with frequency bin 3, corresponding to a frequency of three, is two. Thus two unique viewing devices (viewing devices 1 and 2) were used to present the advertisement only three times.

TABLE 3

|  | Frequency Bin 1 | Frequency Bin 2 | Frequency Bin 3 |
|---|---|---|---|
| Frequency specific reach value | 1 | 0 | 2 |

§2.0 Example Detailed Reach and Frequency System Architecture and Operation

Figure 2:
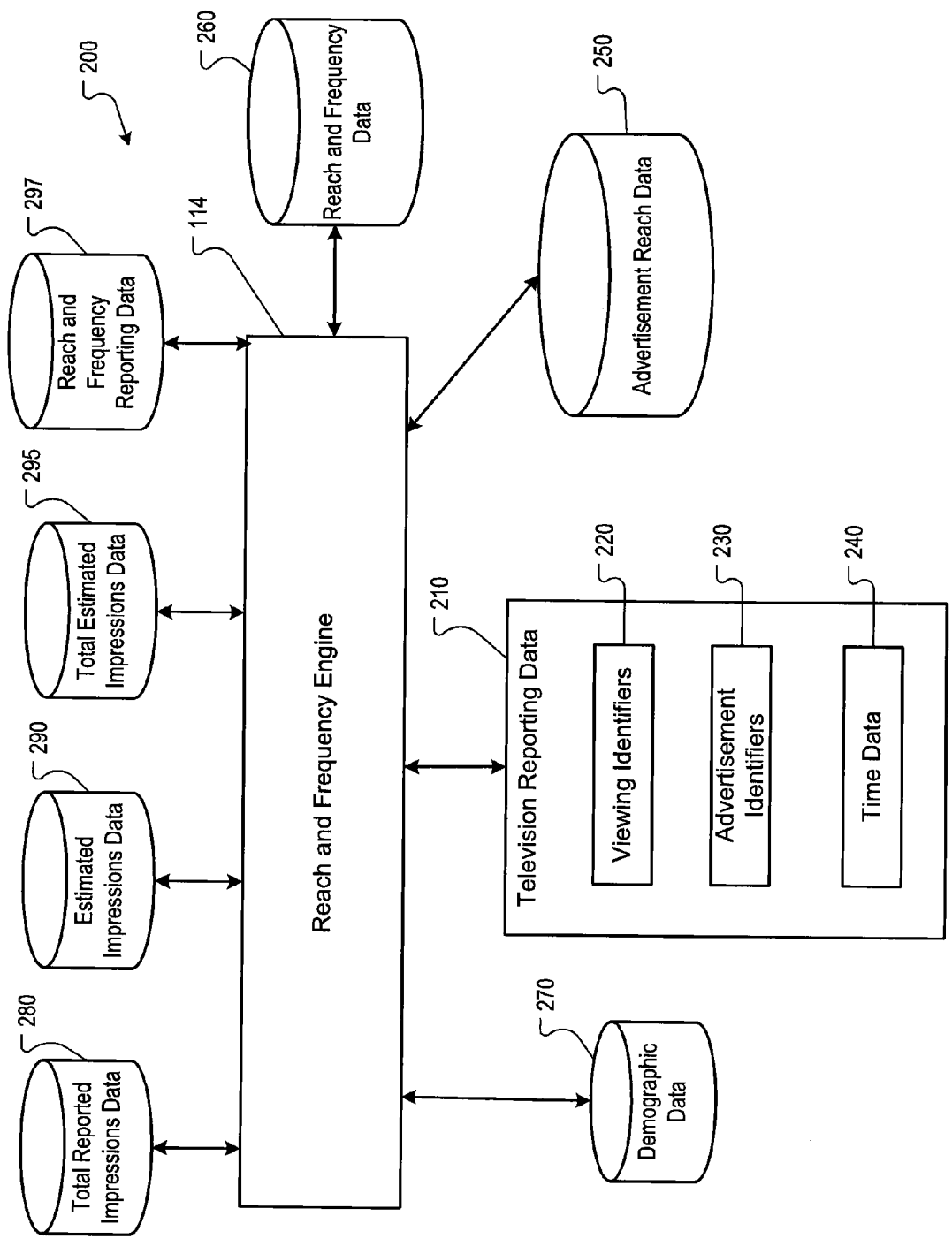
FIG. 2 is a block diagram of an example television advertisement reach and frequency processing system used in the television advertisement system of FIG. 1.

FIG. 2 is a block diagram of an example television advertisement reach and frequency processing system 200 used in the television advertisement system of FIG. 1.

The reach and frequency processing system 200 can facilitate access to television reporting data stored in a television reporting data store 210. The television reporting data can, for example, be derived from the log data 106 and/or impression information from the reporting engine 112; or accessed through a third party that provides the data.

The television reporting data include television reporting records that include viewing identifiers 220 identifying viewing devices 130; advertisement identifiers 230 identifying advertisements that were presented by use of the viewing devices 130; and time data 240 identifying times at which the advertisements were presented by use of the viewing devices 130. The television reporting records can be based on data from the viewing device log data store 106 and advertisement airing information including times during which advertisements were aired and the corresponding channels which aired the advertisements. For example, a television reporting record may include:

V_ID00001111:OperatorID=1243.HeadendID=22.InsertionZone=243.InsertionID=53432934.Channel=123.Start=4:04:52pm.End=4:06:39pm where V_ID00001111 is an anonymized viewing identifier 220, OperatorID, HeadendID, and InsertionZone are identifiers related to a particular operator 120 and corresponding geographic location, InsertionID is an advertisement identifier 230, Channel is a channel identifier, Start is a first tune time indicating when the viewing device 130 tuned to the channel identified by the channel identifier, and End is a second tune time indicating when the viewing device 130 tuned out of the channel identified by the channel identifier. In part, the InsertionID identifies an advertisement that was aired during the time between the first and second tune times by use of the viewing device 130 identified by the viewing identifier 220.

Thus, the viewing identifiers 220, advertisement identifiers 230 and time data 240 can be associated to identify, for each viewing device 130, the advertisements presented by use of the viewing device 130 and the times at which the advertisements were presented. For example, for a reporting period it can be determined from the television reporting data (e.g. stored in the television reporting data store 210), the number of impressions for a particular advertisement resulting from the use a particular viewing device 130.

The television reporting records can also indicate that a television advertisement was not presented by use of a viewing device 130 if the television reporting record indicates that the viewing device was tuned to a different channel during the airing of an advertisement. For example, a television reporting record can indicate that a particular viewing device was tuned to channel 59 during a time period that included the start time 4:04:52 PM and end time 4:06:39 PM, and thus the advertisement identified by the advertisement identifier 53432934 was not shown by use of the viewing device.

The reach and frequency engine 114 can also be configured to define frequency bins, as discussed with reference to Table 3. In some implementations, frequency bins are not restricted to an integer frequency value and may correspond to a range of frequencies, e.g., a frequency bin may define a minimum frequency value and a maximum frequency value. For example, a frequency bin may define a minimum frequency value of fifty-one and a maximum frequency value of fifty-five. Thus all viewing devices used to present the advertisement at least fifty-one times and not in excess of fifty-five times during a reporting period are associated with the frequency bin.

The range of frequencies corresponding to individual frequency bins for an advertisement can also vary. For example, the first fifty frequencies may each correspond to one frequency bin (e.g., one integer frequency value corresponding to one frequency bin), the next fifty frequencies may correspond to frequency bins having a range of five frequencies, and the final 100 frequencies may correspond frequency bins having a range of twenty-five frequencies, as depicted on Table 4:

TABLE 4

| Frequencies | frequencies/bin | Number of Frequency Bins |
|---|---|---|
| 1-50 | 1 | 50 |
| 51-100 | 5 | 10 |
| 101-200 | 25 | 4 |

As such, for television reporting data including a wide frequency distribution of frequencies at which an advertisement is presented by use of a unique viewing device 130, the frequencies corresponding to frequency bins can be defined to limit the number of frequency bins, e.g., for data size management.

Figure 3A:
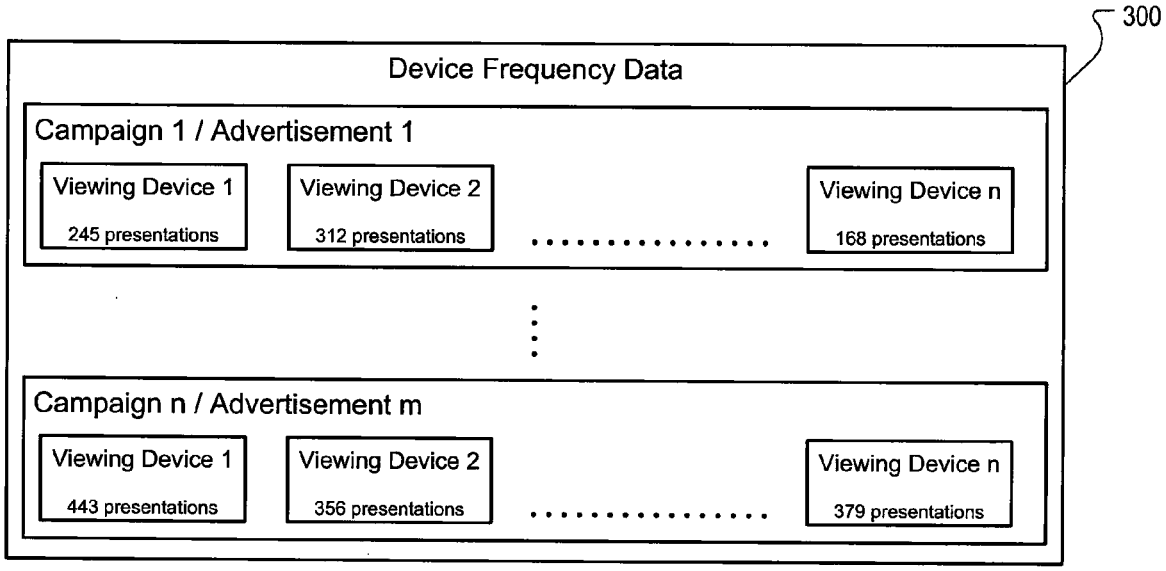
FIG. 3A shows example content of device frequency data.
Figure 3B:
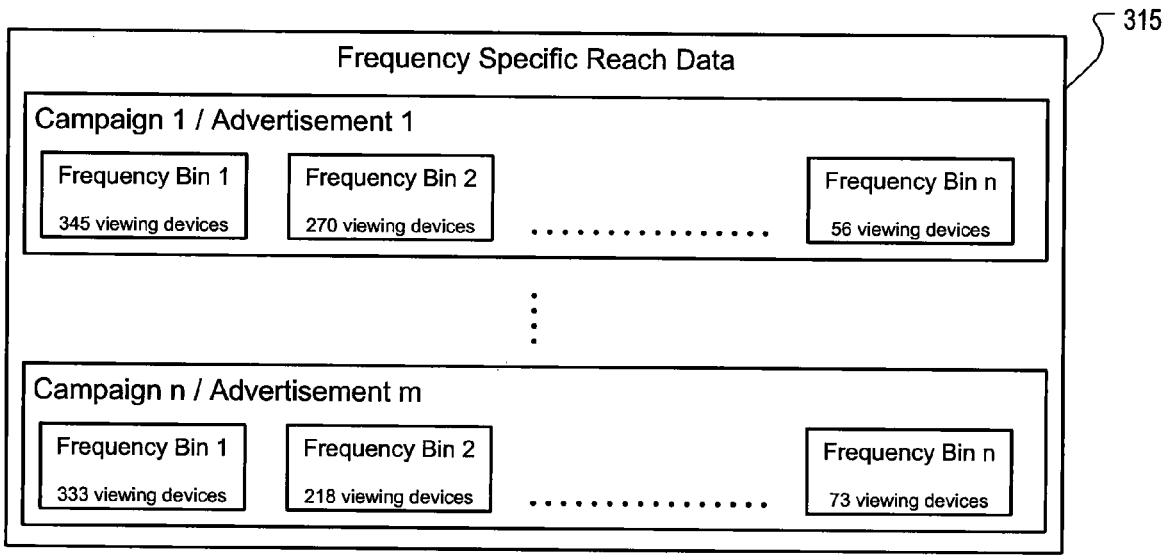
FIG. 3B shows example content of frequency specific reach data.

The reach and frequency engine 114 can also be configured to perform operations to process the television reporting data to generate frequency specific reach data 315 and device frequency data 300. FIG. 3A shows example content of device frequency data. For example, the device frequency data can be generated by the reach and frequency engine 114. FIG. 3B shows example content of frequency specific reach data. For example, the frequency specific reach data can be generated by the reach and frequency engine 114.

The frequency specific reach data 315 and device frequency data 300 can be stored in reach and frequency data store 260. The device frequency data 300 can include device frequencies for each viewing device 130 that quantify the number of times each viewing device 130 was used to present a particular advertisement and/or an advertising campaign.

For example, device frequency data 300 can include device frequencies for viewing device 1, viewing device 2, through viewing device n indicating that viewing device 1, viewing device 2, and viewing device n presented advertisement 1 245 times, 312 times, and 168 times; respectively. As indicated by the hierarchical path "Campaign 1/Advertisement 1, advertisement 1 belongs to Campaign 1. The frequency data can be aggregated according to campaigns, for example, if an advertising campaign is associated with multiple advertisements then the device frequency of a particular viewing device for the advertising campaign is the sum of the device frequencies for that viewing device for each of the advertisements associated with advertising campaign. In some implementations, the device frequency data 300 can include device frequencies for multiple advertising campaigns, such as advertising campaign 1 through advertising campaign n.

Frequency specific reach data 315 can include frequency specific reach values for each frequency bin for a particular advertisement and/or advertising campaign. For example, frequency specific reach data 315 indicate that 345 viewing devices were used to present advertisement 1 at a frequency corresponding to frequency bin 1, 270 viewing devices were used to present advertisement 1 at a frequency corresponding to frequency bin 2, and 56 viewing devices were used to present advertisement 1 at a frequency corresponding to frequency bin n.

Further, if an advertising campaign is associated with multiple advertisements then the frequency specific reach value for a particular frequency bin for the advertising campaign is the sum of the frequency specific reach values for that frequency bin for each of the advertisements associated with advertising campaign. In some implementations, the frequency specific reach data 315 can include frequency specific reach values for multiple advertising campaigns, such as advertising campaign 1 through advertising campaign n.

In various implementations the reach and frequency engine 114 can also aggregate the number of the viewing devices 130 quantified for each frequency specific reach value to determine advertisement reach data (creative reach data) to identify a total number of unique viewing devices that were used to present the advertisement (creative), i.e., the overall reach of the advertisement. The advertisement reach data can, for example, be stored in the advertisement reach data store 250.

As mentioned above, the frequency specific reach data 315 and the device frequency data 300 can be stored in the reach and frequency data store 260. The reach and frequency data store 260 can, for example, be a database 260 stored on a memory device such as a computer hard drive and the frequency specific reach data and device frequency data for a particular advertisement airing can be stored in the database 260 according to the advertisement identifier 230 associated with the advertisement. Further, the frequency specific reach data and device frequency data can also be stored according to advertising campaign identifiers.

The reach and frequency engine 114 can also be configured to access demographic data from, for example, a demographic data store 270. The demographic data may be correlated to the television reporting data and/or the log data 106 to relate the television reporting data and/or log data 106 to demographic information about the viewing population. For example, the demographic data may relate anonymized viewing identifiers 220 to geographic profiles of the viewing population, to age profiles of the anonymized viewers associated with the viewing devices, etc. Based on the demographic data, the frequency specific reach data and device frequency data can be filtered according to desired demographics. For example, the frequency specific reach data and device frequency data can be filtered based on the geographic profile of the viewing population to determine frequency specific reach values and device frequencies for a specific geographic region.

The television reporting data may not include relations between advertisements and advertising campaigns, as described above with reference to FIGS. 3A and 3B. Thus, in some implementations, the reach and frequency engine 114 can access the campaign data 104 to identify campaign identifiers and associations between campaign identifiers and advertisement identifiers. Based on the accessed campaign data 104, the reach and frequency engine 114 can process the reporting data to generate the Example data of FIGS. 3A and 3B.

Figure 4:
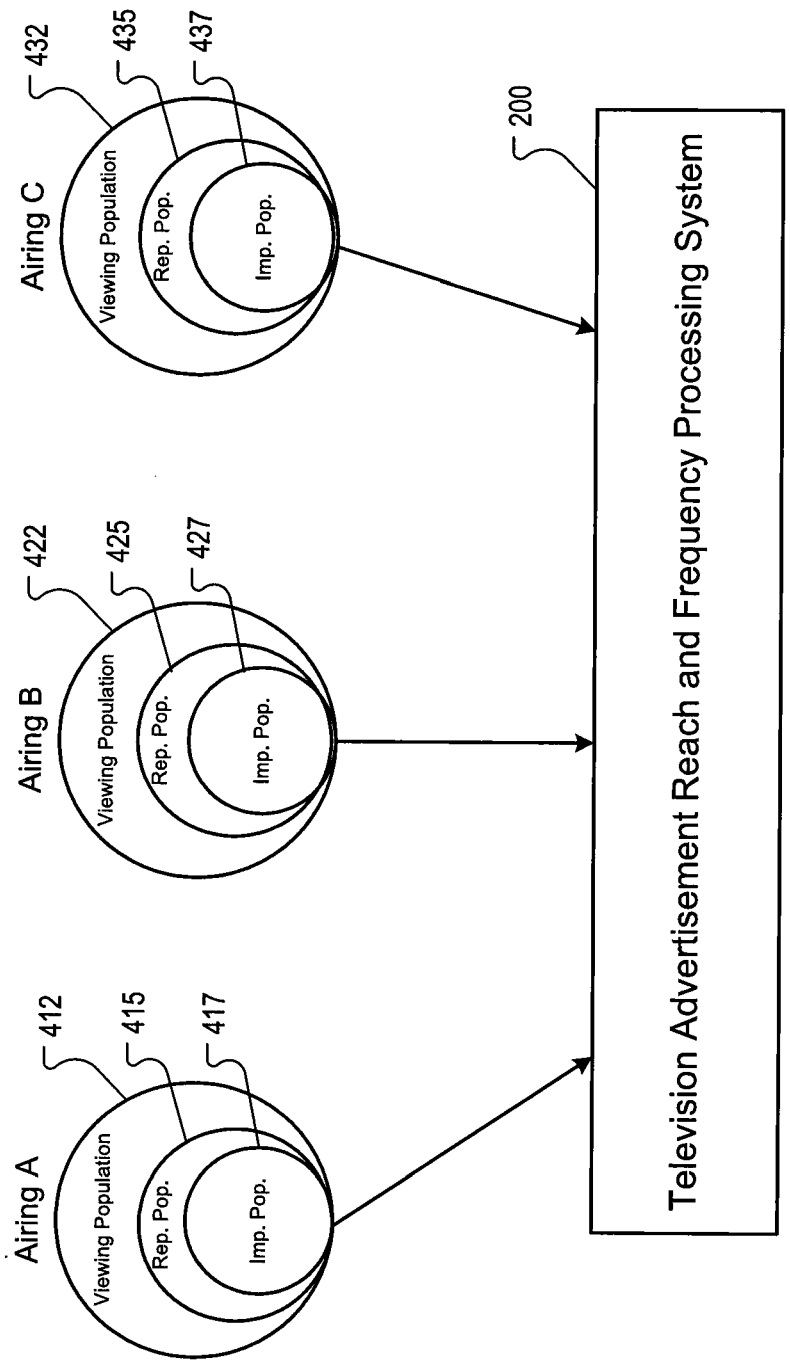
FIG. 4 shows example data reported by viewing devices for use by the television advertisement reach and frequency processing system of FIG. 2.

FIG. 4 shows example data reported by viewing devices for use by the television advertisement reach and frequency processing system of FIG. 2.

An advertisement was aired three times; airings A, B and C. Each airing A, B and C has a respective potential viewing population 412, 422 and 432; a reporting population 415, 425 and 435; and an impressed population 417, 427, and 437; respectively. The viewing population corresponds to the total number of viewing devices 130 in a region. The reporting population corresponds to the number of viewing devices 130 in the viewing population for which reporting records are received correlated to the time of the airing (regardless of whether the viewing device 130 was used to present the advertisement). Reporting populations need not be the same for each airing, and often differ for each airing. The impressed population corresponds to the number of viewing devices 130 in the reporting population that were used to present the advertisement for an airing (i.e., viewing devices 130 that account for an impression).

For a set of n advertisement airings there are on the order of (2^n−1) combinations of how viewing devices 130 in a viewing population could present the advertisement. Further for airings A, B and C each viewing device may have been in the reporting population for one airing (A, B or C), two airings (A+B, B+C or A+C) or all three airings (A+B+C). The number of the reporting population for each of these combinations must be known to determine frequency specific reach data and device frequency data for the potential viewing population. However, each airing combination could have a distinct reporting population, and all airing combinations would have to be calculated individually to estimate frequency specific reach data and device frequency data.

For example, the reporting population for airing combination A+B cannot be derived just by knowing the individual reporting populations for airings A and B. To determine the reporting population for airing combination A+B the intersection of the reporting populations for airing A and airing B must be calculated, i.e., the overlap in the reporting populations between airings A and airing B. This calculation becomes prohibitive for a large number of advertisement airings and large reporting populations.

As discussed above, frequency specific reach data and device frequency data can be generated based on data derived from data logs from viewing devices 130 in a reporting population. However, it is often desirable to estimate frequency specific reach data and device frequency data for the potential viewing population. Because the reporting data are not available from all viewing devices 130 in the viewing population and not all reporting records arrive at once (there can be reporting delays up to a week), frequency specific reach data and device frequency data from the reporting population must be projected onto the viewing population. In other words, the known frequency specific reach data and device frequency data derived from the reporting population must be extrapolated to generate frequency specific reach data and device frequency data for the viewing population.

In various implementations, estimation of frequency specific reach data and device frequency data for the viewing population can be calculated, as explained below, based on a scale factor derived from the number of total reported impressions for all airings and the number of total estimated impressions for all airings.

First the number of total reported impressions must be determined to derive the scale factor. The reach and frequency engine 114 can access the frequency specific reach data and device frequency data (for the reporting population) and calculate a number of total reported impressions for all airings of an advertisement (or advertising campaign) during the reporting period. For example, the reach and frequency engine 114 can calculate the number of total reported impressions of the advertisement and store the results in a total reported impressions data store 280. The number of total reported impressions can be calculated, for example, based on the device frequency data and the frequency specific reach data, according to Equation 1:

$$\text{\# total reported impressions} = \sum_{X=1}^{n} \mathit{fsrv}(\text{frequency\_bin\_X}) * \text{frequency\_X} \qquad \text{Equation 1}$$

where fsrv(frequency_bin_X) is the frequency specific reach value associated with frequency bin X and frequency_X is the frequency that corresponds to frequency bin X. For example, with reference to Table 3, the total number of reported impressions according to Equation 1 is seven, e.g., (1*1)+(0*2)+(2*3)=7, as shown in Table 5:

TABLE 5

| fsrv(frequency_bin_X) | frequency_X | # reported impressions |
|---|---|---|
| frequency_bin_1 | 1 | 1 | 1 |
| frequency_bin_2 | 0 | 2 | 0 |
| frequency_bin_3 | 2 | 3 | 6 |

Second, the number of estimated impressions must be determined. The reach and frequency engine 114 can calculate the number of estimated impressions for each airing, which is needed to calculate the number of total estimated impressions for all airings. The number of estimated impressions for each airing can be calculated, for example, based on the number of reported impressions for an airing (i.e., the impression generating population), the number of reporting records for that airing (i.e., the reporting population), and the number of the viewing population. The calculated number of estimated impressions for each airing for each viewing population (there could be multiple viewing populations) can be stored the estimated impressions data store 290.

In some implementations, the number of estimated impressions for each airing can be calculated, for example, by multiplying the number of the viewing population by the ratio of the number of reported impressions for that airing divided by the number of reporting records for that airing according to Equation 2:

$$\text{\# estimated impressions/airing} = \frac{\text{\# reported\_impressions}}{\text{\# reporting\_records}} * (\text{\# viewing\_population}) \qquad \text{Equation 2}$$

If the airing of the advertisement occurred in multiple viewing populations then the number of estimated impressions for that airing for all viewing populations can be determined by calculating the number of estimated impressions for the airing for each viewing population and then summing the estimated impressions for the airing from all viewing populations.

The number of estimated impressions for each airing can also be determined through other techniques. For example, the number of estimated impressions for each airing can be determined through the use of probability density functions. Further, a number of estimated impressions for an airing can be selected from a probability distribution that satisfies a particular threshold or confidence value, i.e., a minimum probability or likelihood.

With reference to Table 1 (assuming a viewing population of fifteen for all airings) the number of estimated impressions for airing A is according to Equation 2, (⅔)*15=10. Further assume two additional reporting records have been received for Airing B, each additional record indicating the advertisement was not presented. The numbers of estimated impressions for airings B and C can be calculated in a similar manner. The results are depicted on Table 6:

TABLE 6

| | reported impressions | reporting records | viewing population | estimated impressions |
|---|---|---|---|---|
| Airing A | 2 | 3 | 15 | 10 |
| Airing B | 3 | 5 | 15 | 9 |
| Airing C | 2 | 3 | 15 | 10 |

Next, to determine the scale factor the reach and frequency engine 114 can calculate the number of total estimated impressions for all airings, for example, based on the numbers of estimated impressions for each airing and store the number of total estimated impressions for all airings in a total estimated impressions data store 295. The number of total estimated impressions for all airings can be calculated, for example, by summing the numbers of estimated impressions for each airing, according to Equation 3:

$$\text{\# total estimated impressions for all airings} = \sum_{X=1}^{n} \text{\# estimated\_impressions\_airing}(X) \quad \text{Equation 3}$$

where # estimated_impressions_airing (X) is the number of estimated impressions for a particular airing X of airings X=1–n. With reference to Table 6, the number of total estimated impressions can be calculated, for example, according to Equation 3, e.g., 10+9+10=29, as shown on Table 7:

TABLE 7

| | |
|---|---|
| # estimated_impressions_airing(A) | 10 |
| # estimated_impressions_airing(B) | 9 |
| # estimated_impressions_airing(C) | 10 |
| # total estimated impressions for all airings | 29 |

Finally, the reach and frequency engine 114 can calculate the scale factor that can be used to estimate frequency specific reach data and device frequency data for a potential viewing population based on the calculated frequency specific reach data and device frequency data for the reporting population. For example, the scale factor is the ratio of the number of total estimated impressions for all airings divided by the number of total reported impressions for all airings, according to Equation 4:

$$\text{scale factor} = \frac{\text{\# total\_estimated\_impressions}}{\text{\# total\_reported\_impressions}} \quad \text{Equation 4}$$

For example, with reference to Tables 5 and 7, the number of total reported impressions for all airings is seven and the number of total estimated impressions for all airings is twenty-nine. Accordingly, the scale factor is 29/7=4.14, as depicted on Table 8:

TABLE 8

| # total_estimated_impressions | # total_reported_impressions | scale factor |
|---|---|---|
| 29 | 7 | 4.14 |

The reach and frequency engine 114 can be configured to adjust the frequency specific reach data and device frequency data according to the scale factor to estimate the frequency specific reach data and device frequency data for the viewing population. For example, the adjusted frequency specific reach data and adjusted device frequency data for an advertisement can be calculated by multiplying the scale factor by the frequency specific reach value associated with each frequency bin, according to Equation 5:

adjusted frequency specific reach data and device frequency data=scale factor*$fsrv$(frequency_bin_X)    Equation 5

With reference to Tables 3 and 8, the adjusted frequency specific reach data and device frequency data, for example according to Equation 5, are 4.14 viewing devices are estimated to have presented the advertisement one time (e.g., 4.14*1=4.14) and 8.28 viewing devices are estimated to have presented the advertisement three times (e.g., 4.14*2=8.28), as shown on Table 9:

TABLE 9

| | fsrv (frequency_bin_X) | scale factor | adjusted R&F data |
|---|---|---|---|
| frequency_bin_1 | 1 | 4.14 | 4.14 |
| frequency_bin_2 | 0 | 4.14 | 0 |
| frequency_bin_3 | 2 | 4.14 | 8.28 |

The data set used to generate Table 9 is for exemplary purposes and represents only a fraction of the actual data that would be used to determine frequency specific reach data and device frequency data in typical television advertisement systems.

Figure 5:
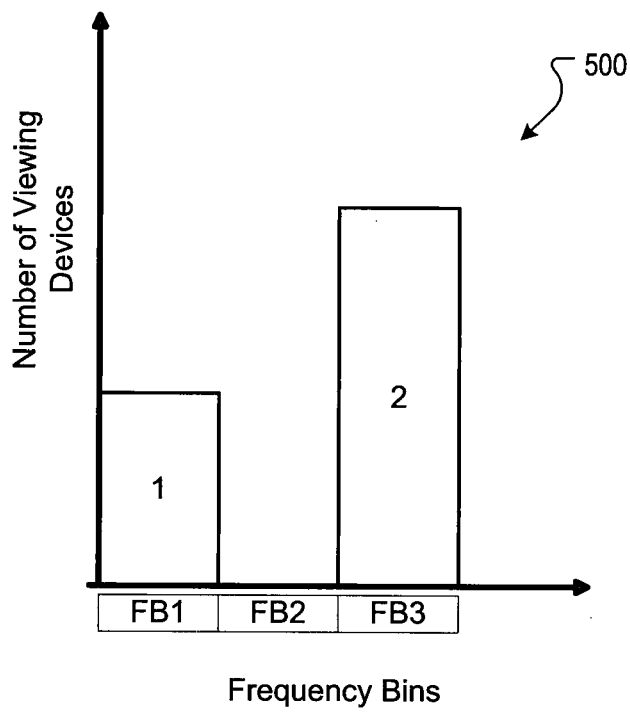
FIG. 5 is an example histogram based on frequency specific reach data and device frequency data.

FIG. 5 is an example histogram based on frequency specific reach data and device frequency data. For example, frequency specific reach data and device frequency data from Table 1 can be used to construct histogram 500. In some implementations, the reach and frequency engine 114 in the television advertisement reach and frequency processing system 200 can generate reach and frequency reporting data and/or adjusted reach and frequency reporting data including the frequency specific reach data and the device frequency data, and the adjusted frequency specific reach data and the adjusted device frequency data, respectively. Such reporting data can be stored in a reach and frequency reporting data store 297. The reach and frequency reporting data and/or adjusted reach and frequency reporting data can be presented by use of histogram 500 or other types of graphical and/or textual representations (of the underlying frequency specific reach data and the device frequency data, and/or adjusted frequency specific reach data and adjusted device frequency data). Further, access to the reach and frequency reporting data and/or adjusted reach and frequency reporting data can be provided to advertisers to illustrate the exposure of the advertisement during the reporting period.

The reach of the advertisement can readily be determined from the histogram 500. The reach or overall reach (the total number of unique viewing devices that were used to present the advertisement) can be determined, for example, according to Equation 6:

$$\text{reach} = \sum_{X=1}^{n} fsrv(\text{frequency\_bin\_X}) \quad \text{Equation 6}$$

With reference to histogram 500, the reach of the advertisement for the reporting population is three: 1(fsrv(frequency_ bin_1))+0(fsrv(frequency_bin_2))+2 (fsrv(frequency_bin_3)). The reach can be stored, for example, in the advertisement reach data store 250.

Figure 6:
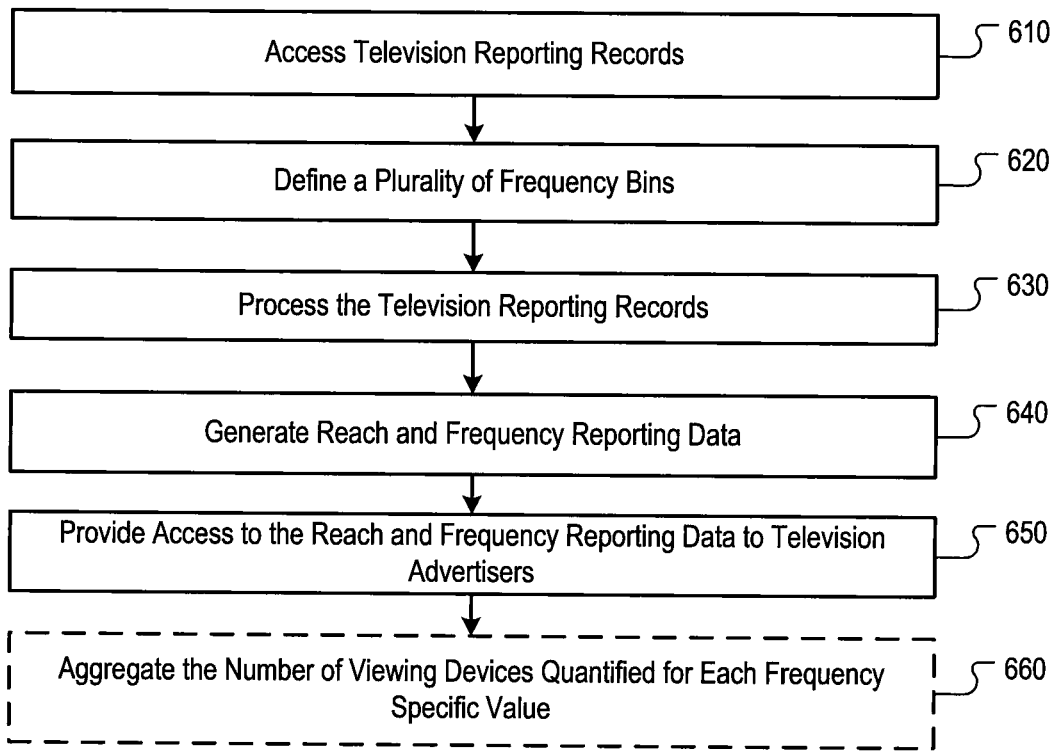
FIG. 6 is a flow diagram of an example process for generating frequency specific reach data and device frequency data.

FIG. 6 is a flow diagram of an example process for generating frequency specific reach data and device frequency data. For example, the process 600 can be implemented in the television advertisement reach and frequency processing system 200 of FIG. 2.

Television reporting records are accessed (610). For example, reach and frequency engine 114 accesses television reporting data stored in the television reporting data store 210, the television reporting data including television reporting records.

A plurality of frequency bins are defined (620). For example, reach and frequency engine 114 defines a plurality of frequency bins, the frequency bins similar to the frequency bins described above with reference to Table 4.

The television reporting records are processed to generate device frequency data and frequency specific reach data (630). For example, the reach and frequency engine 114 processes television reporting data including television reporting records to generate frequency specific reach data including frequency specific reach values and device frequency data including device frequencies similar to the data stored in reach and frequency data store 260.

Reach and frequency reporting data including the frequency specific reach data and the device frequency data are generated (640). For example, the reach and frequency engine 114 in the television advertisement reach and frequency processing system 200 can generate reach and frequency reports representing and based on the reach and frequency reporting data, similar to that stored in reach and frequency reporting data store 297.

Access to the reach and frequency reporting data are provided to television advertisers (650). For example, the television advertisement reach and frequency processing system 200 can provide access to reach and frequency reports to television advertisers to inform the television advertisers about the exposure of the creative.

Optionally, for each advertisement, the number viewing devices quantified for each frequency specific reach value are aggregated to determine advertisement reach data (660) for the advertisement. The advertisement reach data identifies the number of unique viewing devices that were used to present the advertisement. For example, reach and frequency engine 114 can aggregate the number of viewing devices 130 quantified for each frequency specific reach value to determine advertisement reach data similar to that stored in the advertisement reach data store 250.

Consider Table 1, reproduced below:

TABLE 1

|  | Viewing Device 1 | Viewing Device 2 | Viewing Device 3 |
|---|---|---|---|
| Airing A | X | X |  |
| Airing B | X | X | X |
| Airing C | X | X |  |

The process 600 can be implemented, in part, according to the following set of example instructions for each advertisement airing:

```
device_frequency_so_far = current_device_frequency(VD_id)
if device_frequency_so_far > 0
    then fsrv(device_frequency_so_far) =
```

-continued

```
    fsrv(device_frequency_so_far) − 1
  incremented_device_frequency = device_frequency_so_far + 1
current_device_frequency(VD_id) = incremented_device_frequency
fsrv(incremented_device_frequency) =
  fsrv(incremented_device_frequency) + 1
``` where:

current_device_frequency(VD_id) is the current device frequency of a viewing device associated with viewing identifier VD_id;

device_frequency_so_far is the current device frequency of a viewing device;

fsrv(device_frequency_so_far) is the frequency specific reach value associated with the frequency bin corresponding to the frequency of device_frequency_so_far; incremented_device_frequency is the incremented value of device_frequency_so_far; and fsrv(incremented_device_frequency) is the frequency specific reach value associated with the frequency bin corresponding to the frequency of incremented_device_frequency.

Processing the data on Table 1 for viewing device 1 and airing A by the exemplary instructions recited above yields the following results: device_frequency_so_far=0 (the current viewing device frequency for viewing device 1 is zero as viewing device 1 has not yet been used to present the advertisement); as device_frequency_so_far is not greater than zero the incremented_device_frequency=0+1=1; the current_device_frequency (VD1)=1; and the fsrv(1)=0+1=1. The are shown on Table 10:

TABLE 10

| current device frequency | | | frequency specific reach value | | |
|---|---|---|---|---|---|
| VD1 | VD2 | VD3 | frequency 1 | frequency 2 | frequency 3 |
| 1 | 0 | 0 | 1 | 0 | 0 | after airing A (VD1)

Processing the television reporting data on Table 1 for viewing device 2 and airing A by the exemplary instructions recited above yields the following results: device_frequency_so_far=0 (the current viewing device frequency for viewing device 2 is zero as viewing device 2 has not yet been used to present the advertisement); as device_frequency_so_far is not greater than zero the incremented_device_frequency=0+1=1; the current_device_frequency (VD2)=1; and the fsrv(1)=1+1=2. The results are shown on Table 11:

TABLE 11

| current device frequency | | | frequency specific reach value | | |
|---|---|---|---|---|---|
| VD1 | VD2 | VD3 | frequency 1 | frequency 2 | frequency 3 |
| 1 | 1 | 0 | 2 | 0 | 0 | after airing A (VD2)

Viewing device 3 did not present the advertisement for airing A and thus the data for the advertisement is not changed.

Processing the television reporting data on Table 1 for viewing device 1 and airing B by the exemplary instructions recited above yields the following results: device_frequency_so_far=1; as device_frequency_so_far is greater than zero the fsrv(1)=fsrv(1)−1=2−1=1; the incremented_device_frequency=1+1=2; current_device_frequency(VD1)=2; and the fsrv(2)=0+1=1. The results are shown on Table 12:

TABLE 12

| current device frequency | | | frequency specific reach value | | |
|---|---|---|---|---|---|
| VD1 | VD2 | VD3 | frequency 1 | frequency 2 | frequency 3 |
| after airing B (VD1) 2 | 1 | 0 | 1 | 1 | 0 |

Processing the television reporting data on Table 1 for viewing device 2 and airing B by the exemplary instructions recited above yields the following results: device_frequency_so_far=1; as device_frequency_so_fare is greater than zero the fsrv(1)=fsrv(1)−1=1−1=0; the incremented_device_frequency=1+1=2; current_device_frequency(VD2)=2; and the fsrv(2)=1+1=2. The results are shown on Table 13:

TABLE 13

| current device frequency | | | frequency specific reach value | | |
|---|---|---|---|---|---|
| VD1 | VD2 | VD3 | frequency 1 | frequency 2 | frequency 3 |
| after airing B (VD2) 2 | 2 | 0 | 0 | 2 | 0 |

Processing the television reporting data on Table 1 for viewing device 3 and airing B by the exemplary instructions recited above yields the following results: device_frequency_so_far=0 (the current viewing device frequency for viewing device 3 is zero as viewing device 3 has not yet been used to present the advertisement); as device_frequency_so_far is not greater than zero the incremented_device_frequency=0+1=1; the current_device_frequency (VD3)=1; and the fsrv(1)=0+1=1. The results are shown on Table 14:

TABLE 14

| current device frequency | | | frequency specific reach value | | |
|---|---|---|---|---|---|
| VD1 | VD2 | VD3 | frequency 1 | frequency 2 | frequency 3 |
| after airing B (VD3) 2 | 2 | 1 | 1 | 2 | 0 |

After all of the data on Table 1 has been processed according to the set of example instructions, the device frequency for viewing devices 1 and 2 is three, and the device frequency for viewing device 3 is one and the frequency specific reach values associated with frequency bins 1, 2, and 3 are one, zero, and two; respectively; as shown in Table 15:

TABLE 15

| device frequency | | | frequency specific reach value | | |
|---|---|---|---|---|---|
| VD1 | VD2 | VD3 | frequency 1 | frequency 2 | frequency 3 |
| after all airings 3 | 3 | 1 | 1 | 0 | 2 |

Figure 7:
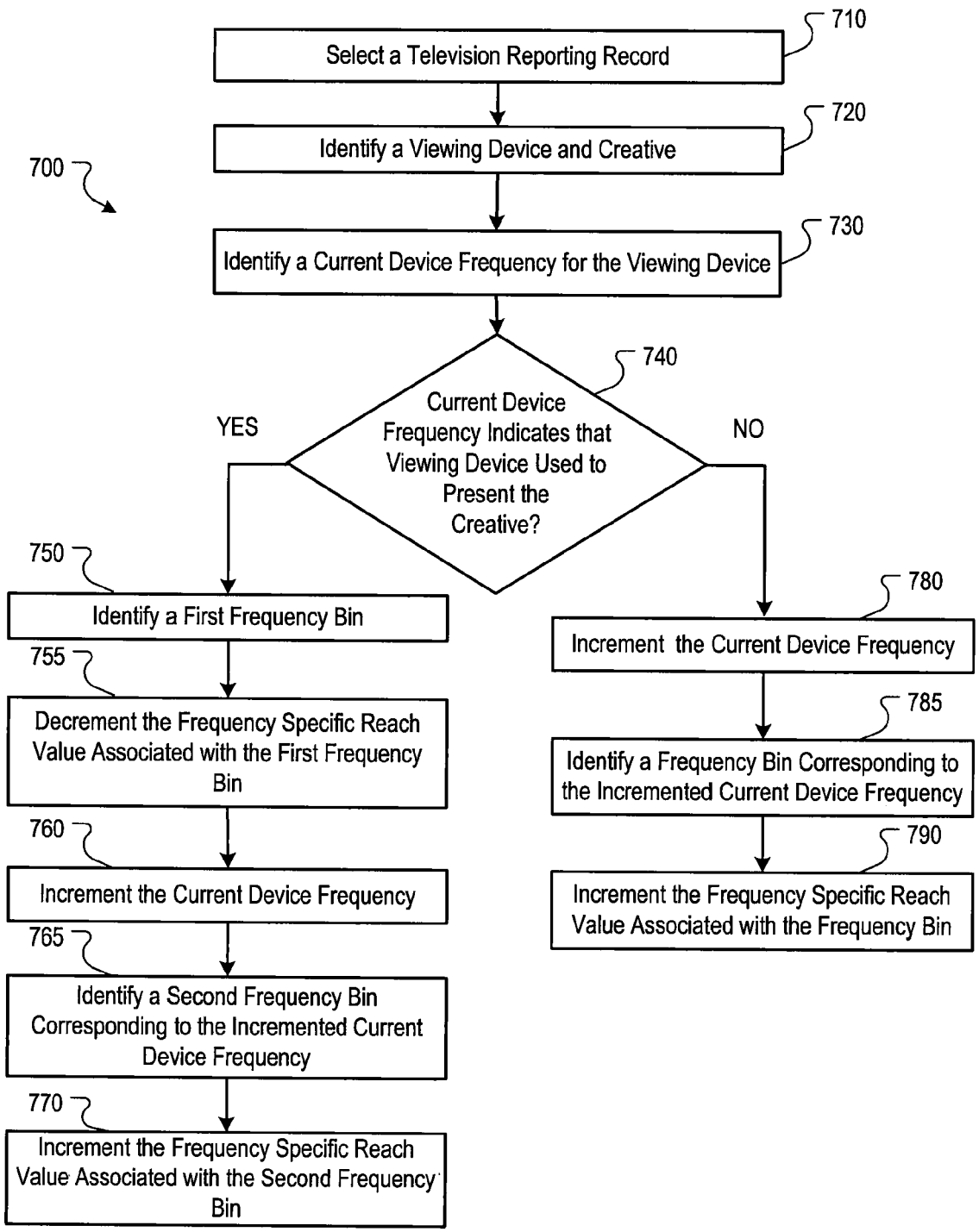
FIG. 7 is a flow diagram of an example process for processing television reporting records to generate frequency specific reach data and device frequency data.

FIG. 7 is a flow diagram of an example process 700 for processing television reporting records to generate frequency specific reach data and device frequency data.

A television reporting record is selected (710). For example, reach and frequency engine 114 can select a television reporting record from television reporting data stored in the television reporting data store 210.

A viewing device and advertisement (creative) are identified from a viewing identifier and advertisement identifier in the television reporting record (720). For example, reach and frequency engine 114 identifies a viewing device 130 and advertisement based on the viewing identifier 220 and advertisement identifier 230 from the television reporting data.

A current device frequency for the viewing device is identified (730). The current device frequency defines the number of times the viewing device has been used to present the advertisement based on the selected television reporting records. Thus, the current device frequency will change when an existing but yet to be selected television reporting record indicates that the viewing device was again used to present the advertisement. For example, reach and frequency engine 114 can identify the current device frequency for the viewing device 130.

It is determined whether the current device frequency indicates that the viewing device has been used to present the advertisement (740). For example, reach and frequency engine 114 can determine if the current device frequency indicates that the viewing device 130 has been used to previously present the advertisement. If the current device frequency of the viewing device 130 is, for example, greater than zero then the viewing device 130 has been used to present the advertisement.

If the viewing device is determined to have been used to present the advertisement, then a first frequency bin corresponding to the current device frequency is identified (750). For example, reach and frequency engine 114 can identify a frequency bin, e.g., a frequency bin discussed with reference to Table 4, associated with a frequency corresponding to the current device frequency.

Further, the frequency specific reach value associated with the first frequency bin will be decremented (755). For example, reach and frequency engine 114 can decrement the frequency specific reach value associated with the first frequency bin to indicate that the current device frequency of the viewing device does not correspond to the frequency associated with the first frequency bin.

The current device frequency is incremented (760). For example, reach and frequency engine 114 can increment the current device frequency.

A second frequency bin corresponding to the incremented current device frequency is identified (765). For example, reach and frequency engine 114 can identify the second frequency bin.

The frequency specific reach value associated with the second frequency bin is incremented (770). For example, reach and frequency engine 114 can increment the frequency specific reach value associated with the second frequency bin to indicate that that the incremented current device frequency of the viewing device corresponds to the frequency associated with the second frequency bin.

If the viewing device is determined to have not been used to present the advertisement, then the current device frequency is incremented (780). For example, reach and frequency engine 114 can increment the current device frequency.

A frequency bin corresponding to the incremented current device frequency is identified (785). For example, reach and frequency engine 114 can identify a frequency bin corresponding to the incremented current device frequency.

The frequency specific reach value associated with the frequency bin is incremented (790). For example, reach and frequency engine 114 can increment the frequency specific reach value associated with the frequency bin.

Figure 8:
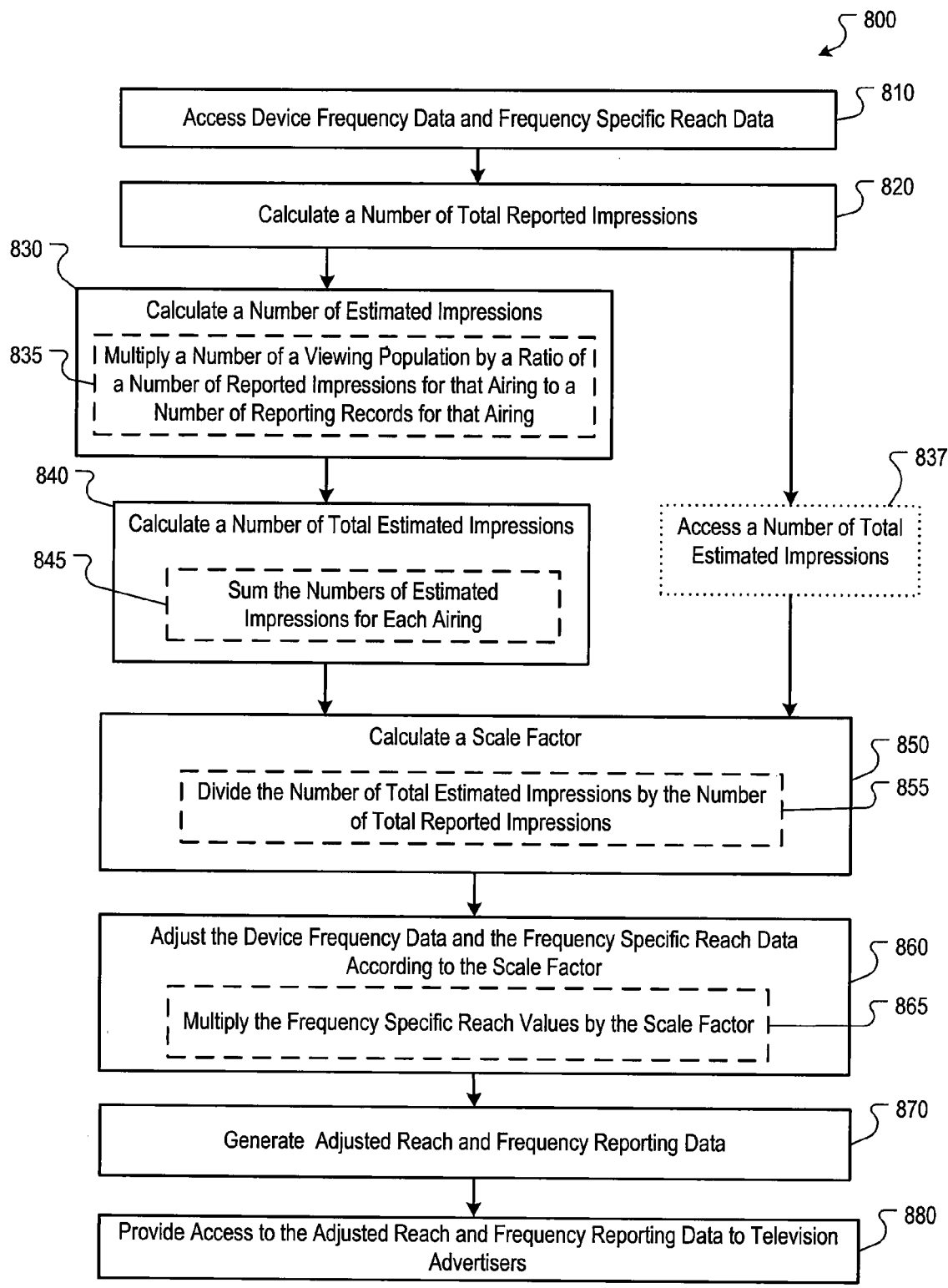
FIG. 8 is a flow diagram of an example process for estimating frequency specific reach data and device frequency data.

FIG. 8 is a flow diagram of an example process 800 for estimating frequency specific reach data and device frequency data.

Device frequency data and frequency specific reach data are accessed (810). For example, reach and frequency engine 114 can access the device frequency data and frequency specific reach data from reach and frequency data store 260.

The number of total reported impressions of the advertisement for all airings is calculated based on the device frequencies and frequency specific reach values (820). For example, reach and frequency engine 114 can calculate the number of total reported impressions of the advertisement for all airing based on the device frequencies and frequency specific reach values included in reach and frequency data store 260.

For each airing of the advertisement, the number of estimated impressions of the advertisement is calculated (830). In some implementations, the number of the viewing population and the ratio of the number of reported impressions for that airing to the number of reporting records for that airing are multiplied to calculate the number of estimated impressions for the airing (835). For example, reach and frequency engine 114 can calculate the number of estimated impressions of the advertisement for each airing and, in some implementations, can calculate the number of estimated impressions for each airing by multiplying the number of the viewing population and the ratio of the number of reported impressions for that airing to the number of reporting records for that airing.

The number of total estimated impressions for all airings of the advertisement is calculated based on the numbers of estimated impressions for each airing (840). In various implementations, the number of total estimated impressions for all airings is calculated by summing the numbers of estimated impressions for each airing (845). For example, reach and frequency engine 114 can calculate the number of total estimated impressions for all airings based on the numbers of estimated impressions for each airing, and in various implementations, can calculate the number of total estimated impressions for all airings by summing the numbers of estimated impressions for each airing.

In some implementations, optionally, the number of total estimated impressions for all airings is accessed (837) instead of calculated. For example, reach and frequency engine 114 can access the number of total estimated impressions for all airings from, for example, an entity that collects, reports, and/or analyzes television viewing pattern data.

A scale factor can be calculated based on the number of total estimated impressions and the number of total reported impressions (850). In some implementations, the scale factor is calculated by dividing the number of total estimated impressions by the number of total reported impressions (855). For example, reach and frequency engine 114 can calculate the scale factor based on the number of total estimated impressions and the number of total reported impressions and, in some implementations, can calculate the scale factor by dividing the number of total estimated impressions by the number of total reported impressions.

The device frequency data and frequency specific reach data can be adjusted according to the scale factor (860). In some implementations, the device frequency data and frequency specific reach data are adjusted by multiplying the frequency specific reach values by the scale factor (865). For example, reach and frequency engine 114 can adjust the device frequency data and frequency specific reach data according to the scale factor and, in some implementations, can adjust the data by multiplying the frequency specific reach values by the scale factor according to, for example, Equation 5.

Adjusted reach and frequency reporting data that include the adjusted frequency specific reach data and the adjusted device frequency data are generated (870). For example, the reach and frequency engine 114 in television advertisement system 100 can generate the adjusted reach and frequency reporting data.

Access to the adjusted reach and frequency reporting data can be provided to television advertisers (880). For example, the television advertisement reach and frequency processing system 200 can provide access to the adjusted reach and frequency reporting data to television advertisers to inform the advertisers about television advertisement exposure.

The television industry typically evaluates advertisement viewership information over rolling seven or thirty-day periods. Thus, the frequency specific reach data and device frequency data can be calculated for these rolling periods. For example, consider that an advertisement has three airings; airing A on June 1st, airing B on June 11th and airing C on June 21st. Throughout June (and some of July), on each day a new set of thirty-day rolling frequency specific reach data and device frequency data is generated. For example, on June 2nd (the day after airing A) frequency specific reach data and device frequency data are generated for the advertisement. As there has only been one airing the data echoes the reported impressions for airing A. Over each of the next seven days (2nd-8th) the frequency specific reach data and device frequency data are updated as new viewing pattern data are reported from the viewing devices. The frequency specific reach data and device frequency data should remain stable for three days (9th-11th) until the day after the second airing (as all viewing pattern data should have been received).

From the 12th to the 18th the frequency specific reach data and device frequency data for airings A and B are gradually refined as viewing pattern data are received. From the 19th to the 21st, frequency specific reach data and device frequency data should again remain stable. After the 22nd the frequency specific reach data and device frequency data are updated and refined as viewing pattern data are received through the 28th. The frequency specific reach data and device frequency data should be stable until July 2nd.

After July 1st, the thirty-day period no longer includes airing A, so from then on frequency specific reach data and device frequency data reflect viewing pattern data for only airings B and C. Similarly on July 12th airing B is no longer included in the thirty-day reporting period, so the frequency specific reach data and device frequency data only reflect viewing pattern data from airing C. Finally by July 22nd airing C is no longer included in the thirty-day period so frequency specific reach data and device frequency data for the advertisement are no longer generated.

Preferably the frequency specific reach data and device frequency data for each day are stored for a predetermined time, so in the above illustration approximately fifty sets of daily frequency specific reach data and device frequency data are stored for the rolling thirty-day reporting period. In general for any advertisement active over n days, n+30 sets of frequency specific reach data and device frequency data are generated for the thirty-day reporting period, and n+7 sets of frequency specific reach data and device frequency data for the seven-day reporting period. This permits the advertiser to review frequency specific reach data and device frequency data generated at various points during the reporting period.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
accessing device frequency data that include device frequencies and frequency specific reach data that include frequency specific reach values from a reach and frequency data store, the device frequencies and the frequency specific reach values based on multiple airings of a creative, each airing defining a unique creative time slot in which the creative was aired;
calculating a number of total reported impressions of the creative for all airings based on the device frequencies and the frequency specific reach values;
for each airing, calculating a number of estimated impressions of the creative;
calculating a number of total estimated impressions for all airings based on the numbers of estimated impressions for each airing;
calculating a scale factor based on the number of total estimated impressions and the number of total reported impressions;
adjusting, by one or more processing devices, the device frequency data and frequency specific reach data according to the scale factor;
generating adjusted reach and frequency reporting data including the adjusted frequency specific reach data and the adjusted device frequency data; and
providing access to the adjusted reach and frequency reporting data to television advertisers.

2. The method of claim 1, wherein calculating the scale factor comprises dividing the number of total estimated impressions by the number of total reported impressions.

3. The method of claim 1, wherein the device frequency data and frequency specific reach data are derived from reporting records for all airings, each reporting record relating to an airing, and for each airing calculating the number of estimated impressions comprises multiplying a number of a viewing population by a ratio of a number of reported impressions for that airing to a number of reporting records for that airing.

4. The method of claim 1, wherein calculating the number of total estimated impressions for all airings comprises summing the numbers of estimated impressions for each airing.

5. The method of claim 1, wherein adjusting the device frequency data and frequency specific reach data comprises multiplying the frequency specific reach values by the scale factor.

6. The method of claim 1, wherein:
the creative is presented by use of a plurality of viewing devices and the device frequencies specify for each of the plurality of viewing devices a number of times the creative was presented by use of the viewing device for all airings of the creative; and
each frequency specific reach value specifies a number of viewing devices having a same unique device frequency.

7. A system, comprising:
one or more processing devices; and
software stored on a computer readable medium comprising instructions executable by the one or more processing devices and upon such execution cause the one or more processing devices to perform operations comprising:
access device frequency data that include device frequencies and frequency specific reach data that include frequency specific reach values, the device frequencies and the frequency specific reach values based on multiple airings of a creative, each airing defining a unique creative time slot in which the creative was aired;
calculate a number of total reported impressions of the creative for all airings based on the device frequencies and the frequency specific reach values;
for each airing, calculate a number of estimated impressions of the creative;
calculate a number of total estimated impressions for all airings based on the numbers of estimated impressions for each airing;
calculate a scale factor based on the number of total estimated impressions and the number of total reported impressions;
adjust the device frequency data and frequency specific reach data according to the scale factor;
generate adjusted reach and frequency reporting data including the adjusted frequency specific reach data and the adjusted device frequency data; and
provide access to the adjusted reach and frequency reporting data to television advertisers.

8. The system of claim 7, wherein the scale factor is based on the number of total estimated impressions divided by the number of total reported impressions.

9. The system of claim 7, wherein the device frequency data and frequency specific reach data are derived from reporting records for all airings, each reporting record relating to an airing, and for each airing the number of estimated impressions is based on a number of a viewing population multiplied by a ratio of a number of reported impressions for that airing to a number of reporting records for that airing.

10. The system of claim 7, wherein the number of total estimated impressions for all airings is based on a sum of the numbers of estimated impressions for each airing.

11. The system of claim 7, wherein the adjusted device frequency data and frequency specific reach data are based on the frequency specific reach values multiplied by the scale factor.

12. The system of claim 7, wherein:
the creative is presented by use of a plurality of viewing devices and the device frequencies specify for each of the plurality of viewing devices a number of times the creative was presented by use of the viewing device for all airings of the creative; and
each frequency specific reach value specifies a number of viewing devices having a same unique device frequency.

13. A computer-implemented method, comprising:
accessing device frequency data that include device frequencies and frequency specific reach data that include frequency specific reach values from a reach and frequency data store, the device frequencies and the frequency specific reach values based on multiple airings of a creative, each airing defining a unique creative time slot in which the creative was aired;
calculating a number of total reported impressions of the creative for all airings based on the device frequencies and the frequency specific reach values;
accessing a number of total estimated impressions for all airings based on numbers of estimated impressions for each airing;
calculating a scale factor based on the number of total estimated impressions and the number of total reported impressions;
adjusting, by one or more processing devices, the device frequency data and frequency specific reach data according to the scale factor;
generating adjusted reach and frequency reporting data including the adjusted frequency specific reach data and the adjusted device frequency data; and
providing access to the adjusted reach and frequency reporting data to television advertisers.

14. The method of claim 13, wherein adjusting the device frequency data and the frequency specific reach data comprises multiplying the frequency specific reach values by the scale factor.

15. The method of claim 13, wherein calculating the scale factor comprises dividing the number of total estimated impressions by the number of total reported impressions.

16. The method of claim 13, wherein:
the creative is presented by use of a plurality of viewing devices and the device frequencies specify for each of the plurality of viewing devices a number of times the creative was presented by use of the viewing device for all airings of the creative; and
each frequency specific reach value specifies a number of viewing devices having a same unique device frequency.

* * * * *